United States Patent [19]

Delaney

[11] 4,363,664

[45] Dec. 14, 1982

[54] NOVEL COMPOSITIONS AND PROCESSES

[75] Inventor: John W. Delaney, Fort Mitchell, Ky.

[73] Assignee: Sterling Drug Inc., New York, N.Y.

[21] Appl. No.: 115,543

[22] Filed: Jan. 25, 1980

[51] Int. Cl.$^3$ .............................................. C09D 11/00

[52] U.S. Cl. ..................................... 106/21; 106/14.5; 282/27.5; 427/150; 427/151; 427/152; 427/153; 428/411; 427/150;151;152;153

[58] Field of Search ................ 106/21, 14.5; 282/27.5; 428/411

[56] References Cited

U.S. PATENT DOCUMENTS

| | | | |
|---|---|---|---|
| 2,712,507 | 7/1955 | Green | 117/36 |
| 2,800,457 | 7/1957 | Green et al. | 252/316 |
| 3,041,289 | 6/1962 | Katchen et al. | 252/316 |
| 3,539,375 | 11/1970 | Baum | 117/36.2 |
| 3,834,823 | 9/1974 | Seregely et al. | 106/21 |
| 3,894,168 | 7/1975 | Brockett et al. | 428/514 |
| 3,936,309 | 2/1976 | Kohmura et al. | 106/21 |
| 4,054,684 | 10/1977 | Ceintrey et al. | 106/21 |
| 4,094,877 | 6/1978 | Crounse et al. | 260/293.58 |
| 4,112,138 | 9/1978 | Davis et al. | 427/54 |
| 4,138,508 | 2/1979 | Spatz | 427/54 |
| 4,139,218 | 2/1979 | Davis et al. | 427/150 |
| 4,143,890 | 3/1979 | Davis et al. | 428/307 |
| 4,151,748 | 5/1979 | Baum | 106/14.5 |
| 4,171,980 | 10/1979 | Ceintrey | 106/21 |
| 4,183,553 | 1/1980 | Petitpierre | 106/21 |

FOREIGN PATENT DOCUMENTS 993656 7/1976 Canada .

*Primary Examiner*—John Kight, III
*Assistant Examiner*—Amelia B. Yarbrough
*Attorney, Agent, or Firm*—Terrence E. Miesle; Lynn T. Fletcher; B. Woodrow Wyatt

[57] ABSTRACT

Stable, concentrated, free-flowing aqueous dispersion compositions containing one or more colorless dyestuff precursors and one or more surface active agents, are useful in the manufacture of paper for pressure sensitive carbonless duplicating manifold systems and thermal marking systems.

44 Claims, No Drawings

NOVEL COMPOSITIONS AND PROCESSES

BACKGROUND OF THE INVENTION

1. Field of the Invention

This invention relates to the field of chemistry and more particularly to novel stable concentrated free-flowing aqueous dispersion compositions containing one or more colorless dyestuff precursors useful in the manufacture of paper for pressure sensitive carbonless duplicating and thermal marking systems; to a process for preparing said dispersions and to the incorporation of colorless dyestuff precursors into pressure sensitive carbonless duplicating manifold systems and thermal marking systems by introducing a concentrated dispersion composition of this invention into coating compositions used in said systems.

2. Description of the Prior Art

Several classes of organic compounds of widely diverse structural types are known to be useful as colorless precursors for carbonless duplicating systems. Among the more important classes, there may be named phenothiazines, for example, benzoyl leuco methylene blue; phthalides, for example, crystal violet lactone; flouorans, for example, 2'-anilino-6'-diethylaminofluoran and 2'-dibenzylamino-6'-diethylaminofluoran; and various other types of colorless precursors currently employed in commercially accepted carbonless copy systems. Typical of the many such systems taught in the prior art are those described in U.S. Pat. Nos. 712,507, 2,800,457 and 3,041,289 which issued July 5, 1955, July 23, 1957 and June 26, 1962, respectively.

These patents and numerous additional patents in the art teach systems in which the colorless precursor is dissolved in a specialized and expensive solvent and then microencapsulated. The microcapsules containing the solutions of the colorless precursors are then coated onto paper out of an aqueous suspension optionally containing a binder. More recently the microcapsules are dispersed in hot wax mixtures and coated on the paper while in the molten state. Typical of the many such systems are those taught in U.S. Pat. Nos. 4,112,138, 4,139,218 and 4,143,890 which issued Sept. 5, 1978, Feb. 13, 1979 and Mar. 13, 1979, respectively. This microencapsulated type of carbonless copy system has several disadvantages. One disadvantage resides in need for specialized and expensive solvents in order to produce the desired solubility of the colorless precursors. The solubility is critical in order to obtain microencapsulated solutions of sufficient concentration for use in pressure-sensitive copying systems. Still another disadvantage is the need to microencapsulate the colorless precursor, which represents a costly additional operation in the manufacture of pressure-sensitive copy and thermal papers.

The following items to date appear to constitute the most relevant prior art with regard to the instant invention.

U.S. Pat. No. 4,138,508, issued Feb. 6, 1979, discloses and claims a paper coating composition comprising a colorless precursor selected from the group consisting of lactone phthalides and lactone fluorans and mixtures thereof dissolved in a carrier oil. The resultant solution is dispersed in a liquid, radiation-curable substance to form a coating composition.

U.S. Pat. No. 3,539,375, issued Nov. 10, 1970, discloses a paper coating slurry comprising water, polyvinyl alcohol, crystal violet lactone, and 4,4'-isopropylidine diphenol for the preparation of thermo-responsive recording paper.

U.S. Pat. No. 3,894,168, issued July 8, 1975, discloses and claims a paper coating slurry comprising water, binder material, and minute water-insoluble, chemically neutral, paper coating particles of mineral, having adsorbed thereon a water-insoluble, chromogenic, substantially colorless basic dye-precursor, the particles being chemically inert to the dye precursor.

Canadian Pat. No. 993,656, issued July 27, 1976, discloses and claims a pressure sensitive carbonless duplicating copy set comprising at least two sheets, of which the top sheet is coated on the under side with a wax containing an acidic developer, and the second sheet coated on the top side with a dyestuff precursor capable of developing a color when brought into intimate contact with the acidic developer.

SUMMARY OF THE INVENTION

The present invention provides for novel stable concentrated free-flowing aqueous dispersion compositions of carbonless duplicating dyestuff precursors which are useful for incorporation into coatings for pressure sensitive carbonless duplicating and heat sensitive marking systems. The compositions of this invention are distinctly advantageous in that they can be added directly to coating compositions thus obviating the need to first dissolve the precursor in a solvent and microencapsulate the solution as taught in the numerous systems known in the prior art.

In its composition of matter aspect, the invention relates to novel stable concentrated free-flowing aqueous dispersion compositions containing at least one colorless carbonless duplicating dyestuff precursor and at least one surface active agent.

In its process aspect, the invention relates to a process for preparing novel stable concentrated free-flowing aqueous dispersion compositions which comprises milling together at least one colorless carbonless duplicating dyestuff precursor and at least one surface active agent in water.

In its method of use aspect, the invention relates to the incorporation of the stable concentrated free-flowing dispersion compositions into coating compositions for carbonless duplicating manifold systems.

DETAILED DESCRIPTION INCLUSIVE OF THE PREFERRED EMBODIMENTS

More specifically, this invention in its composition of matter aspect, resides in novel stable concentrated free-flowing aqueous dispersion compositions containing, by weight of the entire composition, approximately 2.5 to approximately 50 percent of at least one colorless carbonless duplicating dyestuff precursor; approximately 0.1 to approximately 30 percent of at least one surface active agent selected from the group consisting of anionic surface active agents, nonionic surface active agents, cationic surface active agents and amphoteric surface active agents; and the remainder being water optionally containing one or more of the following by weight of the entire composition: no more than 2 percent of an antifoaming agent; no more than 3 percent of an antimicrobial agent; no more than 10 percent of a glycol selected from the group consisting of ethylene glycol, propylene glycol, diethylene glycol and ethylene glycol monoethyl ether; and no more than 3 percent of an alkaline substance selected from the group consisting of triethanolamine, potassium carbonate and sodium carbonate.

In a particular embodiment in accordance with the aforesaid composition of matter aspect, the invention sought to be patented resides in the novel stable concentrated free-flowing aqueous dispersion compositions containing as the carbonless duplicating dyestuff precursors at least one of the compounds selected from the group consisting of phthalides, phenothiazines, fluorans, arylsulfonylmethanes, furopyridinones and furopyrazinones.

In its process aspect, the invention sought to be patented resides in a process for preparing stable concentrated free-flowing aqueous dispersion compositions containing at least one colorless carbonless duplicating dyestuff precursor and at least one surface active agent which comprises milling together, by weight of the entire composition, approximately 2.5 to approximately 50 percent of at least one colorless carbonless duplicating dyestuff precursor; approximately 0.1 to approximately 30 percent of at least one surface active agent selected from the group consisting of anionic surface active agents, nonionic surface active agents, cationic surface active agents and amphoteric surface active agents; and the remainder being water optionally having present one or more of the following by weight of the entire composition: no more than 2 percent of an antifoaming agent; no more than 3 percent of an antimicrobial agent; no more than 10 percent of a glycol selected from the group consisting of ethylene glycol, propylene glycol, diethylene glycol and ethylene glycol monoethyl ether; and no more than 3 percent of an alkaline substance selected from the group consisting of triethanolamine, sodium carbonate and potassium carbonate.

In its method of use aspect, the invention sought to be patented resides in a method of incorporating one or more colorless dyestuff precursors into a coating composition for pressure sensitive carbonless duplicating manifold systems or thermal marking systems which comprises incorporating a stable concentrated free-flowing aqueous dispersion composition of this invention as hereinbefore described into said coating composition.

The term "colorless carbonless duplicating dyestuff precursor(s)" is used herein in the generic sense to mean a group of colorless dyestuff precursors which have utility in both pressure sensitive and thermal responsive marking systems. Preferred among these dyestuff precursors are compounds selected from the classes known generically in the art as phthalides, phenothiazines, fluorans, arylsulfonylmethanes, furopyridinones and furopyrazinones. The following are examples illustrative of a few of the suitable colorless carbonless duplicating dyestuff precursors which can be incorporated into the novel stable concentrated free-flowing aqueous dispersion compositions of this invention: diaryl phthalides, for example, 3,3-bis(4-dimethylaminophenyl)-6-dimethylaminophthalide commonly known as crystal violet lactone, or simply CVL, 3-(4-dimethylaminophenyl)3-[2,4-bis(dimethylamino)phenyl]-6-dimethylaminophthalide and similar compounds described in U.S. Pat. No. 4,094,877 which issued June 13, 1978; aryl heteryl phthalides, for example, 3-[2,4-bis(dimethylamino)phenyl]-3-(1-ethyl-2-methyl-3-indolyl)phthalide disclosed in Belgian Pat. No. 864,376, granted Aug. 28, 1978, and similar compounds found in U.S. Pat. Nos. 3,491,112 and 4,153,609 which issued Jan. 20, 1970 and May 8, 1979, respectively; bis(heteryl)phthalides, for example, 3,3-bis(1-ethyl-2-methyl-3-indolyl)phthalide, 3,3-bis(1-n-butyl-2-methyl-3-indolyl)phthalide and similar compounds described in U.S. Pat. Nos. 3,509,173 and 4,102,893 which issued Jan. 20, 1970 and July 5, 1978, respectively; aryl or heteryl diphenylamino phthalides, for example, 3-(4-dimethylaminophenyl)-3-[di(4-octylphenyl)amino]phthalide, and 3-(1-ethyl-2-methyl-3-indolyl)-3-(diphenylamino)phthalide and similar compounds described in U.S. Pat. Nos. 4,032,527 and 4,182,714 which issued Sept. 18, 1979 and Jan. 8, 1980, respectively; phenothiazines, for example, benzoyl leuco methylene blue, commonly called BLMB; fluorans, for example, 2-anilino-3-methyl-6-diethylaminofluoran described in U.S. Pat. No. 3,681,390 which issued Aug. 1, 1972, 2-dibenzylamino-6-diethylaminofluoran described in U.S. Pat. No. 3,839,361 which issued Oct. 1, 1974, and 2-anilino-3-methyl-6-diethylamino-5′/6′-ethoxycarbonylfluoran described in U.S. patent application Ser. No. 039,017 which was filed May 14, 1979, now patent No. 4,274,610 and similar fluorans; aryl and heteryl disubstituted arylsulfonyl methanes, for example, [bis(4-dimethylaminophenyl) (4-methylphenylsulfonyl)]methane and [(4-dimethylaminophenyl) (1-ethyl-2-methyl-3-indolyl) (4-methylphenylsulfonyl)]methane and other similar compounds described in U.S. patent application Ser. No. 048,599, which was filed June 14, 1979, now U.S. Pat. No. 4,257,954; and furopyridinones and furopyrazinones, for example, 5/7-(2-methoxy-4-diethylaminophenyl)-5/7-(1-ethyl-2-methyl-3-indolyl)-furo[3,4-b]pyridine-5(7H)/7(5H)-one, described in Japanese Patent Publication No. 118515/74, which published Nov. 13, 1974, and 5/7-(1-ethyl-2-methyl-3-indolyl)-5/7-[N-phenyl-N-(4-phenylsulfonamido)-phenyl]furo[2,4-b]pyridine-(7H)/7(5H)-one and similar compounds described in U.S. patent application Ser. No. 968,082 which was filed Dec. 11, 1978, now U.S. Pat. No. 4,211,872.

By the term "surface active agent" is meant those substances which possess the ability to change the surface properties, and more particularly, to promote the formation and stabilization of a dispersion of a solid in a liquid in the system in which they are incorporated. These substances, which generally have both hydrophilic and hydrophobic groups in the molecule, have the property of lowering the surface tension of the liquid in which they are dissolved or partially dissolved or of reducing the interfacial tension between the solid and the liquid, even when used in very low concentrations. Surface active agents useful in practicing this invention embrace a large variety of chemical compounds which may be anionic, nonionic, cationic or amphoteric in nature. The surface active agents preferred for use in this invention are generally well-known and are generally commercially available. There are many types of the anionic, nonionic, cationic and amphoteric surface active agents as described in "McCutcheon's Detergents and Emulsifiers 1978 North American Edition" published by McCutcheon Division, The Manufacturing Confectioner Publishing Co., Glen Rock, N.J. The following are some of the preferred surface active agents.

Anionic surface active agents useful in the preparation of the stable concentrated free-flowing aqueous dispersion compositions of this invention include alkali metal salts of condensed naphthalene sulfonic acids and alkali metal salts of polymeric carboxylic acids, for example, the "Tamols®" of Rohm and Haas Co.; the alkali metal salts of taurates, for example, sodium salt of N-cyclohexyl-N-palmitoyl taurate-"Igepons®" of GAF Corporation; and poly(methylvinyl ether/maleic anhydride), "Gantrezs®" of GAF Corporation.

Nonionic surface active agents useful in the preparation of the stable concentrated free-flowing aqueous dispersion compositions of this invention include sorbitan derivatives, for example, the "Spans®" and "Tweens®" of ICI Americas Inc.; ethoxylated alcohols, for example, "Brijs®" of ICI Americas Inc.; ethoxylated fatty acids, for example, "Myrjs®" of ICI Americas Inc.; alkyl aryl polyether alcohols or ethoxylated alkyl phenols, for example, "Tritons®" of Rohm and Haas Co.; acetylenic glycols, for example, "Surfynols®" of Air Products and Chemicals Inc.; alkylene oxide condensates with hydrophilic bases, for example, "Pluronics®" of BASF Wyandotte and the ethylene oxide condensates of the addition products of propylene oxide to ethylene diamine, for example, "Tetronics®" of BASF Wyandotte.

Cationic surface active agents useful in the preparation of the stable concentrated free-flowing aqueous dispersion compositions of this invention include alkyl dimethyl benzyl ammonium halides, for example, "Roccals®" of Hilton-Davis Chemical Co. Div.; and polymeric quaternary ammonium halides, for example, "Aquonium® C-IV" of Hilton-Davis Chemical Co. Div.

Amphoteric surface active agents useful in the preparation of the stable concentrated free-flowing aqueous dispersion compositions of this invention include fatty alkylamino substituted fatty acids, for example, "Armeen®Z" of Armak Industrial Chemical Div.

As used herein the term "antimicrobial agent" includes any substance compatible with the dispersion composition which has the effect of preventing the growth of bacteria or fungi in the dispersion composition concentrates, for example, the commercial substance, Troysan 174 of Troy Chemical Corp.

As used herein the term "antifoaming agent" includes any substance compatible with the dispersion composition which has the effect of preventing or eliminating foaming in the dispersion composition concentrates, for example, the commercial substances, Foamaster® AP of Diamond Shamrock Corp., Troykyd 999 of Troy Chemical Corp. and Balab® Bubble Buster of Witco Chemical Co.

The colorless dyestuff precursor dispersion compositions of this invention are useful as colorless dyestuff concentrates, which when diluted in a coating composition formulation containing a binder, for example, starch, polyvinyl alcohol or carboxymethyl cellulose, optionally a filler, for example, titanium dioxide, calcium carbonate or a neutral clay and water form an aqueous coating composition for the manufacture of carbonless duplicating color forming sheets. These sheets after being coated and dried are then assembled into a manifold system with the coated side of the paper containing the colorless dyestuff precursor forming the top side of the bottom sheet. The bottom side of the top sheet is coated with a wax coating containing a color developing substance of the electron accepting type. Such systems are described in Canadian Pat. No. 993,656. Application of pressure to the top sheet of the manifold, such as that exerted by a stylus, typewriter or other form of writing or printing causes the portion of the wax layer subjected to pressure to transfer from the back side of the top sheet to the top side of the bottom sheet and, on contact with the colorless dyestuff precursor, reproduces a colored image of good tinctorial strength. It is, of course, obvious that variants of this mode of application can be utilized. For example, the receiving sheet in the manifold can alternatively be coated with the acidic developing agent and the dispersion composition can be incorporated into a wax coating applied to the bottom side of the top sheet in the manifold.

The stable concentrated free-flowing aqueous dispersion compositions of this invention can also be incorporated into coating compositions for thermal responsive papers such as described in U.S. Pat. No. 3,539,375 by intimately mixing the dispersion compositions with an acidic developer of the type described in U.S. Pat. No. 3,539,375 and coating said mixtures onto paper. The ability of the compounds incorporated in the dispersion compositions to form deep colors when heated in admixture with an acidic developer, for example, bisphenol A, makes them useful in thermal paper marking systems, either where an original or a duplicate copy is prepared by contacting the thermal paper with a heated stylus or heated type in any of the methods generally known in the art.

The use of the stable concentrated free-flowing aqueous dispersion compositions of this invention is particularly advantageous in view of the increasing trend toward automation, because these dispersion compositions are conveniently handled and added to the coating mixture in accurately measured amounts by means of pump and meters. The subject dispersion composition concentrates are particularly suited to metered operations because they are stable and free-flowing under ordinary storage conditions. Still another advantage of the subject dispersion compositions is that they readily disperse in the coating systems and obviate the normal wetting out problems associated with dry colorless dyestuff precursors commonly used in the art. A further advantage of the concentrated dispersion compositions is that of convenience in handling and shipping. Furthermore, the concentrated dispersion compositions are more convenient for manufacturers of carbonless duplicating paper in that the problem of handling dry powdered colorless dyestuff precurors, with the concomitant dusting and caking problems associated with suspending the dry powder in the coating mixture prior to its application to paper sheets, is eliminated.

The best mode contemplated by the inventor of carrying out this invention will now be described as to enable any person skilled in the art to which it pertains to make and use the same.

In accordance with the process aspect of this invention the novel stable concentrated free-flowing aqueous dispersion compositions containing one or more colorless dyestuff precursors are obtained by a process in which one or more of the colorless dyestuff precursors is mixed and ground in water with at least one surface active agent, be it anionic, cationic, nonionic, amphoteric or a mixture thereof. The grinding or milling is carried out in any type of mill normally used to reduce the particle size of a solid suspended in a liquid, for example, ball mills, Kady® mill (Kinetic Dispersion Corp., Buffalo, N.Y.), Cowles Dissolver (Cowless Dissolver Co. Inc., Cayuga, N.Y.), Cayuga mill (Process Equipment Co. Inc., Auburn, N.Y.) Attritor (Union Process Inc., Akron, Ohio), Shot mill (Schold Machine Co., St. Petersburg, Fla.) or an Eppenbach Homo- Mixer (Gifford-Wood Co., Hudson, N.Y.). Optionally, the subject compositions may contain one or more additives for improving the physical and storage characteristics of the dispersions. These optional components include antifoaming agents, antimicrobial agents, glycols and/or alkaline substances, any or all of which can be added in amounts desired or required, as the case may be, to impart their respective properties to the dispersion compositions. The optional components can be added to the compositions at any time during their manufacture, that is, before, during or upon completion of the milling operation depending on the physical nature and the function of the optional component. The grinding and dispersing operation is conveniently carried out at ambient temperature with a slight amount of external cooling if needed. The components of the dispersion compositions are used in appropriate quantities to produce by weight of the entire composition approximately 2.5 to approximately 50 percent of at least one colorless carbonless duplicating dyestuff precursor; approximately 0.1 to approximately 30 percent of at least one surface active agent selected from the group consisting of anionic surface active agents, nonionic surface active agents, cationic surface active agents and amphoteric surface active agents; and the remainder being water optionally containing one or more of the following by weight of the entire composition: no more than 2 percent of an antifoaming agent; no more than 3 percent of an antimicrobial agent; no more than 10 percent of a glycol selected from the group consisting of ethylene glycol, propylene glycol, diethylene glycol and ethylene glycol monoethyl ether; and no more than 3 percent of an alkaline substance selected from the group consisting of triethanolamine, potassium carbonate and sodium carbonate.

The following examples set forth details of the preparation of the stable concentrated free-flowing aqueous dispersion compositions of colorless dyestuff precursors useful in the manufacture of paper for pressure sensitive carbonless duplicating and thermal marking systems. These examples will further illustrate the invention without, however, limiting it thereto.

In the following examples, the test results are described on the quality of images developed when the dispersion composition concentrates were incorporated into a coating system, coated sheets prepared and the sheets incorporated into a two sheet manifold and tested as described in Example 1. The images, which developed on the face of the second sheet (Coated Front, CF) when pressure was applied by means of a stylus to the face of the top sheet (Coated Back, CB) of the manifold, were examined under daylight and evaluated with respect to the intensity of the developed colored image. The evaluations were graded on the basis of the following scale: strong=a very deep intense image; moderate=an intermediately-colored image; and a weak=a readable, but very light-colored image.

EXAMPLE 1

Preparation of Dispersion

A mixture of: 2.5 g of 3,3-bis(4-dimethylaminophenyl)-6-dimethylaminophthalide; 0.5 g of benzoyl leuco methylene blue; 2.0 g of 3-[2,4-bis(dimethylamino)phenyl]-3-(4-dimethylaminophenyl)-6-dimethylaminophthalide; 1.0 g of a 20 percent aqueous solution of a cationic polymeric quaternary ammonium chloride-type surface active agent (Aquonium ® C-IV, Hilton-Davis Chemical Co. Div.); 40.0 ml of water; and 80.0 g of ⅜ inch diameter steel grinding beads were placed in a container which was placed on a roller mill. Rolling was effected for approximately eighteen hours at ambient temperature. The steel beads were then removed by filtering the mixture through cotton cheesecloth.

The dispersion thus obtained containing by weight of the entire composition approximately 10.7 percent colorless dyestuff precursor, approximately 0.5 percent surface active agent and approximately 88.8 percent water was incorporated into coating compositions which were used to prepare coated sheets for carbonless duplicating manifold systems.

Preparation and Testing of Coated Sheets in a Manifold System

A. With stirring 1.0 g of the dispersion prepared above, 2.5 g of powdered titanium dioxide, 5.2 g of water and 1.0 g of 5.0 percent aqueous polyvinyl alcohol (approximately 99 percent hydrolyzed) were uniformly mixed. The mixture was then evenly coated on sheets of paper using a coating rod (a stainless steel rod wound with No. 6 stainless steel wire) and the sheets air-dried. The paper thus coated with the colorless precursor was assembled as the bottom sheet in a manifold system by positioning the coated side (CF) in contact with the coated side of a commercially available transfer sheet as the top sheet coated on the back side (CB) with a wax coating containing a color developer of the electron accepting type. An image was then drawn with a stylus on the top sheet causing the color developer on its under side to transfer to the receiving sheet coated on its top side with the colorless precursor whereupon a strong red-blue-colored image promptly formed. The developed image exhibited good tinctorial strength and excellent xerographic copiability characteristics.

B. Proceeding in a manner similar to that described in part A above, but substituting calcium carbonate of a particle size of 0.75 micron for the titanium dioxide and a 5.0 percent aqueous solution of carboxymethylcellulose for the solution of polyvinyl alcohol, a pressure sensitive carbonless duplicating manifold system was prepared which produced a strong red-blue-colored quantitively identical image to that described in part A above.

C. Following the procedure described in part A above, but replacing the titanium dioxide with Ultrawhite ® 90 clay (Engelhard Mineral and Chemical Co.) and the 5.0 percent aqueous polyvinyl alcohol with a 5.0 percent aqueous starch solution, a pressure sensitive carbonless duplicating manifold system was prepared which produced a strong red-blue-colored quantitively identical image to that described in part A above.

EXAMPLE 2

A mixture of: 2.0 g of 2-anilino-3-methyl-6-diethylaminofluoran; 1.0 g of a 20 percent aqueous solution of a cationic polymeric quaternary ammonium chloride-type surface active agent (Aquonium ® C-IV, Hilton-Davis Chemical Co. Div.); 35.0 ml of water; and 80.0 g of ⅜ inch diameter steel grinding beads was charged into a container which was placed on a roller mill. Rolling was effected for approximately eighteen hours at ambient temperature. The steel grinding beads were removed by filtration through cotton cheesecloth.

The resulting dispersion containing by weight of the entire composition approximately 5.3 percent colorless dyestuff precursor, approximately 0.26 percent surface active agent and approximately 94.4 percent water was then used to prepare a pressure sensitive carbonless duplicating manifold system similar to that described in Example 1, part A above. Impression with a stylus promptly produced a strong green-black-colored image on the bottom sheet (CF) which exhibited good tinctorial strength and excellent xerographic copiability characteristics.

EXAMPLE 3

A mixture of: 35.0 ml of distilled water; 30.0 g of 3,3-bis(4-dimethylaminophenyl)-6-dimethylaminophthalide; 7.5 g of a 20 percent aqueous solution of a cationic polymeric quaternary ammonium chloride-type surface active agent (Aquonium® C-IV, Hilton-Davis Chemical Co. Div.); and 70.0 g of 1/16 inch diameter glass beads was stirred vigorously at ambient temperature for approximately two hours utilizing a Hamilton-Beach No. 30 mixer (Hamilton-Beach Co., Racine, Wis.) equipped with a 1⅝ inch diameter Cowles agitator blade at an applied voltage of approximately 50 volts. Microscopic examination of the resulting dispersion disclosed that the average particle size of the phthalide color precursor was between 1 and 3 microns. With stirring, 77.5 ml of distilled water was added to the dispersion and the glass beads were removed by filtration of the dispersion through cotton cheesecloth to obtain approximately 145 g of dispersion.

When the dispersion containing by weight of the entire composition approximately 20 percent colorless dyestuff precursor, approximately 1 percent surface active agent and approximately 79 percent water was incorporated into a pressure sensitive carbonless duplicating manifold system similar to that described in Example 1, part A above, a strong blue-colored image having excellent tinctorial strength developed on the bottom sheet (CF) upon impression with a stylus.

EXAMPLE 4

With external cooling, a mixture of: 101.0 ml of distilled water; 1.59 g of an alkylaryl polyether-type nonionic surface active agent (Triton® CF-10, Rohm & Haas Co.); 9.0 g of a sodium salt of polymeric carboxylic acid type anionic surface active agent (Tamol® 731, Rohm & Haas Co.); 0.5 g of an antifoam agent (Troykyd 999, Troy Chemical Corp.); 90.0 g of 3-[2,4-bis(dimethylamino)phenyl]-3-(4-dimethylaminophenyl)-6-dimethylaminophthalide; and 180.0 g of 1/16 inch diameter glass beads were vigorously agitated for approximately one hour using a Hamilton-Beach No. 30 mixer equipped with a 1⅝ inch diameter Cowles blade. The resulting particle size of the phthalide when examined under a microscope was approximately one micron. The dispersion thus obtained was filtered through cotton cheesecloth to remove the glass beads.

When the dispersion containing approximately 45.7 percent colorless dyestuff precursor, approximately 5.4 percent surface active agents, approximately 0.25 percent antifoam agent and approximately 48.6 percent water was incorporated into a pressure sensitive carbonless duplicating manifold system similar to that described in Example 1, part A above, a strong red-blue-colored image developed on the bottom sheet (CF) upon impression with a stylus which had excellent tinctorial strength and xerographic copiability characteristics.

The following table lists dispersions of this invention prepared in a manner similar to that described in Example 1 above. The colorless dyestuff precursor or combination of colorless dyestuff precursors listed in the second column were milled with a polymeric quaternary ammonium chloride-type surface active agent, shown in the third column, in water to obtain the stable concentrated free-flowing aqueous dispersion composition. The weight of each component and the percent by weight of the entire composition of said component is so indicated in each of the component columns. The dispersion compositions were incorporated into carbonless duplicating manifold systems and tested employing the procedure described in Example 1, parts A, B and C above. The developed image produced is described in the fifth column of the table.

TABLE A

| Example No | Wt. & (Percent) of Color Precursors | | Wt. & (Percent) Type of Surface Active Agents | | | Wt. & (Percent) of Water | Developed Image |
|---|---|---|---|---|---|---|---|
| 5 | 2.0 g (5.3) | 2-Dibenzylamino-6-diethylamino-fluoran | 1.0 g (0.53) | Cationic | Polymeric quaternary ammonium chloride[1] | 35.0 g (94.2) | Moderate green-colored |
| 6 | 2.0 g (5.3) | [Bis(4-dimethylaminophenyl) (phenylsulfonyl)]methane | 1.0 g (0.53) | " | Polymeric quaternary ammonium chloride[1] | 35.0 g (94.2) | Moderate purple-colored |
| 7 | 1.0 g (2.7) | 5/7-(1-n-Butyl-2-methyl-3-indolyl)-5/7-[N—(4-phenyl-sulfonamido)phenyl-N—phenyl]-amino [3,4-b]pyridine-5(7H)/7-(5H)-one | 0.5 g (0.27) | " | Polymeric quaternary ammonium chloride[1] | 35.0 g (97) | Moderate tan-colored |
| 8 | 2.0 g (5.3) | [(4-Dimethylaminophenyl)(1-ethyl-2-methyl-3-indolyl)(4-methylphenylsulfonyl)]methane | 1.0 g (0.53) | " | Polymeric quaternary ammonium chloride[1] | 35.0 g (94.2) | Strong red-colored |
| 9 | 3.0 g (8.3) | 3-(4-Dimethylaminophenyl)-3-[bis(4-octylphenyl)amino]-phthalide | 1.25 g (0.65) | " | Polymeric quaternary ammonium chloride[1] | 30.0 g (85.5) | Strong black-colored |
| | 1.5 g (4.1) | 3,3-bis(4-dimethylamino-phenyl)-6-dimethylamino-phthalide | | | | | |
| | 0.5 g (1.4) | Benzoyl leuco methylene blue | | | | | |
| 10 | 4.0 g (16) | 2-Anilino-3-methyl-6-diethyl-amino-5'/6'-ethoxycarbonyl-fluoran | 1.0 g (0.8) | " | Polymeric quaternary ammonium | 20.7 g (83.2) | Moderate green-colored |

TABLE A-continued

| Example No | Wt. & (Percent) of Color Precursors | | Wt. & (Percent) Type of Surface Active Agents | | Wt. & (Percent) of Water | Developed Image |
|---|---|---|---|---|---|---|
| | | | | chloride[1] | | |
| 11 | 1.5 g (4.2) | 3,3-Bis(4-dimethylaminophenyl)-6-dimethylaminophthalide | 0.75 g (0.41) | " Polymeric quaternary ammonium chloride[1] | 31.5 g (94.1) | Strong red-blue-colored |
| | 0.38 g (1.1) | Benzoyl leuco methylene blue | | | | |
| | 1.5 g (4.2) | 3-(4-dimethylaminophenyl)-3-[2,4-bis(dimethylamino)phenyl]-6-dimethylaminophthalide | | | | |
| 12 | 1.0 g (2.9) | 3-(4-Dimethylaminophenyl)-3-[2,4-bis(dimethylamino)phenyl]-6-dimethylaminophthalide | 1.0 g (0.57) | " Polymeric quaternary ammonium chloride[1] | 30.0 g (87.8) | Strong red-blue-colored |
| | 1.0 g (2.9) | Benzoyl leuco methylene blue | | | | |
| | 2.0 g (5.8) | 3,3-bis(4-dimethylaminophenyl)-6-dimethylaminophthalide | | | | |
| 13 | 5.0 g (30.8) | Benzoyl leuco methylene blue | 1.25 g (1.54) | " Polymeric quaternary ammonium chloride[1] | 10.0 g (67.7) | Strong blue-colored |

[1]Aquonium ® C-IV, Hilton-Davis Chemical Company Division

The following table lists dispersions of this invention prepared in a manner similar to that described in Examples 3 and 4 above with the exception of Example 48 below which was ball milled with 1908.0 g of 1 cm diameter by 1 cm long ceramic cylinders in a two liter mill for approximately 64 hours at ambient temperature. The colorless dyestuff precursor or combination of colorless dyestuff precursors listed in the second column were milled with a surface active agent, shown in the third column, in water containing the optional components shown in the sixth column to obtain the stable concentrated free-flowing aqueous dispersion composition. The weight of each component and the percent by weight of the entire composition of said component is so indicated in each of the component columns. The dispersion compositions were incorporated into carbonless duplicating manifold systems and tested employing the procedure described in Example 1, parts A, B and C above. The developed image produced is described in the fifth column of the table.

TABLE B

| Example No. | Wt. & (Percent) of Color Precursors | | Wt. & (Percent) Type of Surface Active Agents | | | Wt. & (Percent) of Water | Developed Image | Wt. & (Percent) of Optional Components | |
|---|---|---|---|---|---|---|---|---|---|
| 14 | 75.0 g (32.3) | 3-(1-ethyl-2-methyl-3-indolyl)-3-N—(diphenylamino)phthalide | 7.6 g (3.3) | Anionic | Sodium salt of polymeric carboxylic acid[1] | 130.0 g (56) | Weak orange-colored | 0.6 g (0.26) | Antifoam agent[3] |
| | | | 1.3 g (0.56) | Nonionic | Alkylaryl polyether[2] | | | 1.5 g (0.65) | Antimicrobial agent[4] |
| | | | | | | | | 1.34 g (5.8) | Ethylene glycol |
| | | | | | | | | 2.7 g (1.1) | Triethanol amine |
| 15 | 28.8 g (22.6) | 3-(1-ethyl-2-methyl-3-indolyl)-3-N—(diphenylamino)phthalide | 2.0 g (1.6) | Nonionic | Polyoxy (40) stearate[5] | 105.0 g (75.8) | Weak orange-colored | None | |
| 16 | 30.0 g (32.2) | 3-(1-ethyl-2-methyl-3-indolyl)-3-N—(diphenylamino)phthalide | 7.5 g (1.6) | Cationic | Polymeric quaternary ammonium chloride[6] | 55.8 g (66.2) | Weak orange-colored | None | |
| 17 | 30.0 g (20) | 3,3-Bis(1-butyl-2-methyl-3-indolyl)-phthalide | 4.4 g (3) | Cationic | Polymeric quaternary ammonium chloride[7] | 87.0 g (77) | Weak red-colored | None | |
| 18 | 30.0 g (20) | 3,3-Bis(1-butyl-2-methyl-3-indolyl)-phthalide | 4.4 g (3) | " | Polymeric quaternary ammonium chloride[7] | 87.0 g (77) | Weak red-colored | None | |
| 19 | 30.0 g (20) | 3,3-Bis(1-butyl-2-methyl-3-indolyl)-phthalide | 3.0 g (2) | Nonionic | Acetylenic glycol blend in ethylene glycol[8] | 87.0 g (78) | Strong red-colored | None | |
| 20 | 30.0 g (21.8) | 3,3-Bis(1-butyl-2-methyl-3-indolyl)-phthalide | 3.0 g (2.2) | Amphoteric | N—Coco-amino-butyric acid[9] | 104.5 g (75.5) | Strong red-colored | 0.6 g (0.43) | Antifoam agent[3] |
| 21 | 30.0 g (20) | 3,3-Bis(1-butyl-2-methyl-3-indolyl)-phthalide | 3.0 g (1) | Cationic | Alkyl dimethyl ammonium chloride[10] | 121.0 g (79) | Moderate red-colored | None | |
| 22 | 30.0 g (20) | 3,3-Bis(1-butyl-2-methyl-3-indolyl)-phthalide | 3.0 g (2) | Cationic | Cyclic tertiary amine base | 75.0 g (78) | Weak red-colored | None | |

TABLE B-continued

| Example No. | Wt. & (Percent) of Color Precursors | | Wt. & (Percent) Type of Surface Active Agents | | | Wt. & (Percent) of Water | Developed Image | Wt. & (Percent) of Optional Components | |
|---|---|---|---|---|---|---|---|---|---|
| 23 | 30.0 g (24.4) | 3,3-Bis(1-butyl-2-methyl-3-indolyl)-phthalide | 3.0 g (2.4) | Nonionic | Tetramethyl decynediol in ethylene glycol[12] | 105.0 g (72.8) | Weak red-colored | 0.6 g (0.43) | Antifoam agent[3] |
| 24 | 30.0 g (20) | 3,3-Bis(1-butyl-2-methyl-3-indolyl)-phthalide | 3.0 g (2) | Nonionic | Sorbitan monooleate[13] | 117.0 g (78) | Weak red-colored | None | |
| 25 | 30.0 g (20) | 3,3-Bis(1-butyl-2-methyl-3-indolyl)-phthalide | 3.0 g (2)<br>3.0 g (2) | Nonionic<br>Nonionic | Sorbitan monooleate[13]<br>Polyoxyethylene (20) sorbitan monooleate[14] | 117.0 g (76) | Moderate red-colored | None | |
| 26 | 30.0 g (20) | 3,3-Bis(1-butyl-2-methyl-3-indolyl)-phthalide | 3.0 g (2) | Nonionic | Ethylene oxide condensates of propylene oxide condensed to propylene glycol[15] | 116.0 g (78) | Moderate red-colored | None | |
| 27 | 18.0 g (19.8) | 3,3-Bis(4-dimethylaminophenyl)-6-dimethylaminophthalide | 0.2 g (0.22) | Nonionic | Ethylene oxide condensates of propylene oxide - propylene glycol condensates[15] | 72.9 g (80) | Moderate blue-colored | None | |
| 28 | 3.34 g (7.5) | 3,3-Bis(4-dimethylaminophenyl)-6-dimethylaminophthalide | 2.8 g (6.28) | Anionic | Sodium salt of polymeric carboxylic acid[16] | 30.0 g (67.4) | Weak blue-colored | 0.3 g (0.67)<br>0.4 g (0.9)<br>5.0 g (11.1)<br>3.0 g (6.7) | Antifoam agent[17]<br>Antimicrobial agent[4]<br>Ethylene glycol<br>Sodium sesquicarbonate |
| 29 | 23.7 g (23.7) | 3,3-Bis(4-dimethylaminophenyl)-6-dimethylaminophthalide | 0.67 g (0.67) | Anionic | Sodium salt of polymeric carboxylic acid[16] | 75.4 g (75.4) | Moderate blue-colored | 0.2 g (0.2) | Antifoam agent[17] |
| 30 | 30.0 g (39.8) | 3,3-Bis(4-dimethylaminophenyl)-6-dimethylaminophthalide | 2.0 g (2.66) | Nonionic | Polyoxy (40) stearate[5] | 43.0 g (57.2) | Moderate blue-colored | 0.2 g (0.27) | Antifoam agent[18] |
| 31 | 25.0 g (18.3) | 3,3-Bis(4-dimethylaminophenyl)-6-dimethylaminophthalide | 6.0 g (4.38) | Nonionic | Ethylene oxide condensate of propylene oxide - ethylene diamine condensates[19] | 106.0 g (77.4) | Strong blue-colored | None | |
| 32 | 25.0 g (37.4) | 3,3-Bis(4-dimethylaminophenyl)-6-dimethylaminophthalide | 6.0 g (8.85) | Nonionic | Ethylene oxide condensate of propylene oxide- ethylene diamine condensates[20] | 35.0 g (52.3) | Strong blue-colored | 0.2 g (0.3) | Antifoam agent[18] |
| 33 | 25.0 g (32.8) | 3,3-Bis(4-dimethylaminophenyl)-6-dimethylaminophthalide | 6.0 g (7.9) | Anionic | Sodium—N—cyclohexyl-N—palmitoyl taurate[21] | 45.0 g (59) | Strong blue-colored | 0.2 g (0.26) | Antifoam agent[18] |
| 34 | 25.0 g (8.2) | 3,3-Bis(4-dimethylaminophenyl)-6-dimethylaminophthalide | 6.0 g (1.96) | Nonionic | Polyoxyethylene (2) stearyl ether[22] | 275.0 g (89.8) | Weak blue-colored | 0.2 g (0.07) | Antifoam agent[18] |
| 35 | 25.0 g (32.9) | 3,3-Bis(4-dimethylaminophenyl)-6-dimethylaminophthalide | 6.0 g (7.9) | Nonionic | Acetylenic glycol blend in ethylene glycol[8] | 45.0 g (59.2) | Moderate blue-colored | None | |
| 36 | 30.0 g (29.7) | 3,3-Bis(4-dimethylaminophenyl)-6-dimethylaminophthalide | 2.0 g (1.98) | Nonionic | Polyoxyl (40) stearate[5] | 68.0 g (67.4) | Weak blue-colored | None | |

TABLE B-continued

| Example No. | Wt. & (Percent) of Color Precursors | | Wt. & (Percent) Type of Surface Active Agents | | | Wt. & (Percent) of Water | Developed Image | Wt. & (Percent) of Optional Components | |
|---|---|---|---|---|---|---|---|---|---|
| | | | 1.0 g (0.99) | Nonionic | Tetramethyldecynediol[12] | | | | |
| 37 | 30.0 g (34.3) | 3,3-Bis(4-dimethylaminophenyl)-6-dimethylaminophthalide | 4.0 g (4.8) | Cationic | Alkyl dimethyl ammonium chloride[10] | 50.5 g (60.7) | Weak blue-colored | 0.2 g (0.24) | Antifoam agent[17] |
| 38 | 25.0 g (23.6) | 3,3-Bis(4-dimethylaminophenyl)-6-dimethylaminophthalide | 6.0 g (5.7) | Anionic | Poly(methylvinyl ether/maleic anhydride)[23] | 75.0 g (70.7) | Weak blue-colored | None | |
| 39 | 30.0 g (36.8) | 3,3-Bis(4-dimethylaminophenyl)-6-dimethylaminophthalide | 7.5 g (9.2) | Cationic | Polymeric quaternary ammonium chloride[7] | 43.9 g (54) | Strong blue-colored | None | |
| 40 | 16.66 g (28.6) | 3-[2,4-Bis(dimethylamino)phenyl]-3-(4-dimethylaminophenyl)-6-dimethylaminophthalide | 2.8 g (4.8) | Anionic | Sodium salt of polymeric carboxylic acids[16] | 30.0 g (51.4) | Moderate red-blue-colored | 0.3 g (0.51) | Antifoam agent[17] |
| | | | | | | | | 0.4 g (0.69) | Antimicrobial agent[4] |
| | | | | | | | | 5.0 g (8.6) | Ethylene glycol |
| | | | | | | | | 3.0 g (5.2) | Sodium sesquicarbonate |
| 41 | 30.0 g (38.8) | 3-[2,4-Bis(dimethylamino)phenyl]-3-(4-dimethylaminophenyl)-6-dimethylaminophthalide | 0.5 g (0.65) | Anionic | Sodium salt of condensed naphthalene sulfonic acid[24] | 46.0 g (59.6) | Strong red-blue-colored | None | |
| | | | 0.7 g (0.9) | Nonionic | Alkylarylpolyether[2] | | | | |
| 42 | 25.0 g (32.9) | 3-[2,4-Bis(dimethylamino)phenyl]-3-(4-dimethylaminophenyl)-6-dimethylaminophthalide | 6.0 g (7.9) | Nonionic | Polyoxyl (40) stearate[5] | 45.0 g (59.2) | Strong red-blue-colored | None | |
| 43 | 50.0 g (37) | 3-[2,4-Bis(dimethylamino)phenyl]-3-(4-dimethylaminophenyl)-6-dimethylaminophthalide | 25.0 g (18.5) | Anionic | Sodium salt of polymeric carboxylic acids[25] | 60.0 g (44.6) | Strong red-blue-colored | None | |
| 44 | 30.0 g (30.9) | 3-[2,4-Bis(dimethylamino)phenyl]-3-(4-dimethylaminophenyl)-6-dimethylaminophthalide | 2.0 g (2.1) | Nonionic | Tetramethyldecynediol[12] | 65.0 g (67) | Strong red-blue-colored | None | |
| 45 | 90.0 g (30.7) | 3-[2,4-Bis(dimethylamino)phenyl]-3-(4-dimethylaminophenyl)-6-dimethylaminophthalide | 1.59 g (0.54) | Nonionic | Alkylaryl polyether | 193.0 g (65.7) | Strong red-blue-colored | None | |
| | | | 9.0 g (3.1) | Anionic | Sodium salt of polymeric carboxylic acids[1] | | | | |
| 46 | 3.34 g (5.4) | 3,3-Bis(4-dimethylaminophenyl)-6-dimethylaminophthalide | 2.8 g (4.6) | Anionic | Sodium salt of polymeric carboxylic acids[1] | 24.0 g (39.2) | Moderate purple-colored | 0.2 g (0.33) | Antifoam agent[3] |
| | | | | | | | | 0.4 g (0.65) | Antimicrobial agent[4] |
| | 16.66 g (26.2) | 3-(4-Dimethylaminophenyl)-3-[2,4-bis-(dimethylamino)phenyl]-6-dimethylaminophthalide | 0.5 g (0.82) | Nonionic | Alkylaryl polyether[2] | | | 5.0 g (8.2) | Ethylene glycol |
| | 8.3 g (13.6) | 3,3-Bis(1-butyl-2-methyl-3-indolyl)-phthalide | | | | | | | |
| 47 | 3.34 g (5) | 3,3-Bis(4-dimethylaminophenyl)-6-dimethylaminophthalide | 2.8 g (4.2) | Anionic | Sodium salt of polymeric carboxylic acid[1] | 30.0 g (44.6) | Moderate purple-colored | 0.2 g (0.3) | Antifoam agent[3] |
| | | | | | | | | 0.4 g (0.6) | Antimicrobial agent[4] |
| | 16.66 g (24.8) | 3-(4-Dimethylaminophenyl)-3-[2,4-bis-(dimethylamino)phenyl]-6-dimethylaminophthalide | 0.5 g (0.74) | Nonionic | Alkylaryl polyether[2] | | | 5.0 g (7.4) | Ethylene glycol |
| | | | | | | | | 1.0 g (1.5) | Triethanol amine |
| | 8.3 g (12.4) | 3,3-Bis(1-butyl-2-methyl-3-indolyl)-phthalide | | | | | | | |
| 48 | 17.9 g (3.8) | 3,3-Bis(dimethylaminophenyl)-6-dimethyl- | 15.2 g (3.2) | Anionic | Sodium salt of polymeric | 268.0 g (51.5) | Moderate purple- | 1.1 g (0.22) | Antifoam agent[3] |

TABLE B-continued

| Example No. | Wt. & (Percent) of Color Precursors | | Wt. & (Percent) Type of Surface Active Agents | | | Wt. & (Percent) of Water | Developed Image | Wt. & (Percent) of Optional Components | |
|---|---|---|---|---|---|---|---|---|---|
| | | aminophthalide | | | carboxylic acid[1] | | colored | 2.1 g (0.44) | Antimicrobial agent[4] |
| | 89.4 g (18.9) | 3-(4-Dimethylaminophenyl)-3-[2,4-bis-(dimethylamino)phenyl]-6-dimethylaminophthalide | 2.7 g (0.57) | Nonionic | Alkylaryl polyether[2] | | | 26.9 g (5.7) | Ethylene glycol |
| | 44.6 g (9.4) | 3,3-Bis(1-butyl-2-methyl-3-indolyl)phthalide | | | | | | 5.46 g (1.1) | Triethanol amine |
| 49 | 3.34 g (5) | 3,3-Bis(4-dimethylaminophenyl)-6-dimethylaminophthalide | 2.8 g (4.2) | Anionic | Sodium salt of polymeric carboxylic acids[16] | 30.0 g (45) | Moderate purple-colored | 0.3 g (0.45) | Antifoam agent[17] |
| | 16.66 g (2.5) | 3-(4-Dimethylaminophenyl)-3-[2,4-bis-(dimethylamino)phenyl]-6-dimethylaminophthalide | | | | | | 0.4 g (0.6) | Antimicrobial agent[4] |
| | 8.3 g (12.5) | 3,3-Bis(butyl-2-methyl-3-indolyl)phthalide | | | | | | 5.0 g (7.5) | Ethylene glycol |

[1]Tamol® 731, Rohm and Haas Co.
[2]Triton® CF10, Rohm and Haas Co.
[3]Troykyd 999, Troy Chemical Corp.
[4]Troysan 174, Troy Chemical Corp.
[5]Myrj® 52, ICI Americas Inc.
[6]Aquonium® C-IV, Hilton-Davis Chemical Co. Div.
[7](Unassigned), Hilton-Davis Chemical Co. Div.
[8]Surfynol® TG, Air Products and Chemicals Inc.
[9]Armeen® Z, Armak Chemical Div.
[10]Roccal® 50%, Hilton-Davis Chemical Co. Div.
[11]Nalcamine® G-13, Nalco Chemical Co.
[12]Surfynol® 104E, Air Products and Chemicals Inc.
[13]Span® 80, ICI Americas Inc.
[14]Tween® 80, ICI Americas Inc.
[15]Pluronic® 61, BASF Wyandotte
[16]Tamol® 850, Rohm and Haas Co.
[17]Foamaster® AP, Diamond Shamrock Corp.
[18]Balab® Bubble Buster, Witco Chemical Co.
[19]Tetronic® 50RB, BASF Wyandotte
[20]Tetronic® 707, BASF Wyandotte
[21]Igepon® CN42, GAF Corp.
[22]Brij® 72, ICI Americas Inc.
[23]Ganex® V220, GAF Corp.
[24]Tamol® SN, Rohm and Haas Co.
[25]Tamol® 960, Rohm and Haas Co.

What is claimed is:

1. A storage-stable concentrated free-flowing aqueous dispersion composition consisting essentially of by weight of the entire composition approximately 2.5 to approximately 50 percent of at least one colorless carbonless duplicating dyestuff precursor selected from the group consisting of phthalides, phenothiazines, fluorans, arylsulfonylmethanes, furopyridinones and furopyrazinones; approximately 0.1 to approximately 30 percent of at least one surface active agent selected from the group consisting of anionic surface active agents, nonionic surface active agents, cationic surface active agents and amphoteric surface active agents; and water; said composition optionally containing one or more of the following by weight of the entire composition: no more than 10 percent of a glycol selected from the group consisting of ethylene glycol, propylene glycol, diethylene glycol and ethylene glycol monoethyl ether; and no more than 3 percent of an alkaline substance selected from the group consisting of triethanolamine, sodium carbonate and potassium carbonate.

2. A storage-stable concentrated free-flowing aqueous dispersion composition according to claim 1 wherein the dyestuff precursors are phthalides.

3. A storage-stable concentrated free-flowing aqueous dispersion composition according to claim 2 wherein the surface active agent is an anionic surface active agent.

4. A storage-stable concentrated free-flowing aqueous dispersion composition according to claim 3 containing by weight of the entire composition: approximately 33 to approximately 38 percent of 3,3-bis(4-dimethylaminophenyl)-6-dimethylaminophthalide; approximately 7 to approximately 10 percent of the sodium salt of N-cyclohexyl-N-palmitoyl tautrate; and water.

5. A storage-stable concentrated free-flowing aqueous dispersion composition according to claim 3 containing by weight of the entire composition: approximately 34 to approximately 39 percent of 3-[2,4-bis(-dimethylamino)phenyl]-3-(4-dimethylaminophenyl)-6-dimethylaminophthalide; approximately 16 to approximately 20 percent of the sodium salt of polymeric carboxylic acid; and the remainder being water.

6. A storage-stable concentrated free-flowing aqueous dispersion composition according to claim 3 containing by weight of the entire composition: approximately 23 to approximately 28 percent of 3,3-bis(4-dimethylaminophenyl)-6-dimethylaminophthalide; approximately 3 to approximately 7 percent of 3-[2,4-bis(-dimethylamino)phenyl]-3-(4-dimethylaminophenyl)-6-dimethylaminophthalide; approximately 11 to approximately 15 percent of 3,3-bis(1-butyl-2-methyl-3-indolyl)phthalide; approximately 3 to approximately 6 percent of the sodium salt of polymeric carboxylic acid; zero to 10 percent of ethylene glycol; and water.

7. A storage-stable concentrated free-flowing aqueous dispersion composition according to claim 2 wherein the surface active agent is a nonionic surface active agent.

8. A storage-stable concentrated free-flowing aqueous dispersion composition according to claim 7 containing by weight of the entire composition: approximately 29 to approximately 33 percent of 3,3-bis(4-dimethylaminophenyl)-6-dimethylaminophthalide; approximately 6 to approximately 9 percent of an acetylenic glycol blend in ethylene glycol; and the remainder being water.

9. A storage-stable concentrated free-flowing aqueous dispersion composition according to claim 7 containing by weight of the entire composition: approximately 30 to approximately 35 percent of 3-[2,4-bis(-dimethylamino)phenyl]3-(4-dimethylaminophenyl)-6-dimethylaminophthalide; approximately 6 to approximately 10 percent of polyoxyl (40) stearate; and the remainder being water.

10. A storage-stable concentrated free-flowing aqueous dispersion composition according to claim 7 containing by weight of the entire composition: approximately 21 to approximately 25 percent of 3-(1-ethyl-2-methyl-3-indolyl)-3-N-(diphenylamino)phthalide; approximately 0.5 to approximately 2.5 percent of the polyoxyl (40) stearate; and the remainder being water.

11. A storage-stable concentrated free-flowing aqueous dispersion composition according to claim 7 containing by weight of the entire composition: approximately 18 to approximately 23 percent of 3,3-bis(1-butyl-2-methyl-3-indolyl)phthalide; approximately 1 to approximately 3 percent of a mixture of ethylene oxide condensates of propylene oxide condensate of propylene glycol; and the remainder being water.

12. A storage-stable concentrated free-flowing aqueous dispersion composition according to claim 7 containing by weight of the entire composition: approximately 18 to approximately 23 percent of 3,3-bis(1-butyl-2-methyl-3-indolyl)phthalide; approximately 0.5 to approximately 1.5 percent of sorbitan monooleate; approximately 0.5 to approximately 1.5 percent of polyoxyethylene sorbitan monooleate; and the remainder being water.

13. Storage-stable concentrated free-flowing aqueous dispersion compositions according to claim 2 wherein the surface active agent is a cationic surface active agent.

14. A storage-stable concentrated free-flowing aqueous dispersion composition according to claim 13 containing by weight of the entire composition: approximately 18 to approximately 23 percent of 3,3-bis(4-dimethylaminophenyl)-6-dimethylaminophthalide; approximately 0.5 to approximately 1.5 percent of polymeric quaternary ammonium chloride; and the remainder being water.

15. A storage-stable concentrated free-flowing aqueous dispersion composition according to claim 13 containing by weight of the entire composition: approximately 43 to approximately 48 percent of 3,3-bis(4-dimethylaminophenyl)-6-dimethylaminophthalide; approximately 2 to approximately 4 percent of a mixture of alkyl dimethyl benzyl ammonium chlorides; and the remainder being water.

16. A storage-stable concentrated free-flowing aqueous dispersion composition according to claim 13 containing by weight of the entire composition: approximately 30 to approximately 35 percent of 3-(1-ethyl-2-methyl-3-indolyl)-3-N-(diphenylamino)phthalide; approximately 1 to approximately 2.5 percent of polymeric quaternary ammonium chloride; and the remainder being water.

17. A storage-stable concentrated free-flowing aqueous dispersion composition according to claim 13 containing by weight of the entire composition: approximately 18 to approximately 23 percent of 3,3-bis(1-butyl-2-methyl-3-indolyl)phthalide; approximately 0.5 to approximately 1.5 percent of a mixture of alkyl dimethyl benzyl ammonium chlorides; and the remainder being water.

18. A storage-stable concentrated free-flowing aqueous dispersion composition according to claim 2 wherein the surface active agents are a mixture of anionic and nonionic surface active agents.

19. A storage-stable concentrated free-flowing aqueous dispersion composition according to claim 18 containing by weight of the entire composition: approximately 15 to approximately 27 percent of 3,3-bis(4-dimethylaminophenyl)-6-dimethylaminophthalide; approximately 2 to approximately 7 percent of 3-[2,4-bis(-dimethylamino)phenyl]-3-(4-dimethylaminophenyl)-6-dimethylaminophthalide; approximately 7 to approximately 14 percent of 3,3-bis(1-butyl-2-methyl-3-indolyl)phthalide; approximately 1.5 to approximately 5 percent of sodium salt of polymeric carboxylic acid; approximately 0.2 to approximately 1.5 percent of alkylaryl polyether; zero to approximately 10 percent of an ethylene glycol; zero to approximately 0.5 percent of triethanolamine; and water.

20. A storage-stable concentrated free-flowing aqueous dispersion composition according to claim 18 containing by weight of the entire composition: approximately 30 to approximately 35 percent of 3,3-bis(1-butyl-2-methyl-3-indolyl)phthalide; approximately 2.5 to approximately 4.5 percent of sodium salt of polymeric carboxylic acid; approximately 0.3 to approximately 1 percent of alkylaryl polyether; zero to approximately 7 percent of ethylene glycol; zero to approximately 2 percent of triethanolamine; and water.

21. A storage-stable concentrated free-flowing aqueous dispersion composition according to claim 18 containing by weight of the entire composition: approximately 30 to approximately 48 percent 3-[2,4-bis(dimethylamino)phenyl]-3-(4-dimethylaminophenyl)-6-dimethylaminophthalide; approximately 1 to approximately 7 percent of a nonionic surface active agent selected from the group consisting of the sodium salt of polymeric carboxylic acid and the sodium salt of condensed naphthalene sulfonic acid; approximately 0.3 to approximately 1.5 percent of alkylaryl polyether; and the remainder being water.

22. A storage-stable concentrated free-flowing aqueous dispersion composition according to claim 2 wherein the surface active agents are amphoteric surface active agents.

23. A storage-stable concentrated free-flowing aqueous dispersion composition according to claim 22 containing by weight of the entire composition: approximately 20 to approximately 25 percent of 3,3-bis(1-butyl-2-methyl-3-indolyl)phthalide; approximately 1.5 to approximately 3 percent of N-cocoaminobutyric acid; and the remainder being water.

24. A storage-stable concentrated free-flowing aqueous dispersion composition according to claim 1 wherein the dyestuff precursors are fluorans.

25. A storage-stable concentrated free-flowing aqueous dispersion composition according to claim 24 wherein the surface active agent is a cationic surface active agent.

26. A storage-stable concentrated free-flowing aqueous dispersion composition according to claim 25 containing by weight of the entire composition: approximately 4 to approximately 10 percent of 2-anilino-3-methyl-6-diethylaminofluoran; approximately 0.5 to approximately 3 percent of polymeric quaternary ammonium chloride; and the remainder being water.

27. A storage-stable concentrated free-flowing aqueous dispersion composition according to claim 25 containing by weight of the entire composition: approximately 4 to approximately 10 percent of 2-dibenzylamino-6-diethylaminofluoran; approximately 0.5 to approximately 3 percent of polymeric quaternary ammonium chloride; and the remainder being water.

28. A storage-stable concentrated free-flowing aqueous dispersion composition according to claim 25 containing by weight of the entire composition: approximately 4 to approximately 10 percent of 2-anilino-3-methyl-6-diethylamino-5'/6'-ethoxycarbonylfluoran; approximately 0.5 to approximately 3 percent of polymeric quaternary ammonium chloride; and the remainder being water.

29. A storage-stable concentrated free-flowing aqueous dispersion composition according to claim 1 wherein the dyestuff percursors are arylsulfonylmethanes.

30. A storage-stable concentrated free-flowing aqueous dispersion composition according to claim 29 wherein the surface active agent is a cationic surface active agent.

31. A storage-stable concentrated free-flowing aqueous dispersion composition according to claim 30 containing by weight of the entire composition: approximately 4 to approximately 10 percent of [bis(4-dimethylaminophenyl)(4-methylphenylsulfonyl)]methane; approximately 0.5 to approximately 3 percent of polymeric quaternary ammonium chloride; and the remainder being water.

32. A storage-stable concentrated free-flowing aqueous dispersion composition according to claim 30 containing by weight of the entire composition: approximately 4 to approximately 10 percent of [(1-ethyl-2-methyl-3-indolyl)(4-dimethylaminophenyl)(4-dimethylphenylsulfonyl)]methane; approximately 0.5 to approximately 3 percent of polymeric quaternary ammonium chloride; and the remainder being water.

33. A storage-stable concentrated free-flowing aqueous dispersion composition according to claim 1 wherein the dyestuff percursors are phenothiazines.

34. A storage-stable concentrated free-flowing aqueous dispersion composition according to claim 33 wherein the surface active agent is a cationic surface active agent.

35. A storage-stable concentrated free-flowing aqueous dispersion composition according to claim 34 containing by weight of the entire composition: approximately 28 to approximately 33 percent of benzoyl leuco methylene blue; approximately 0.5 to approximately 3 percent of polymeric quaternary ammonium chloride; and the remainder being water.

36. A storage-stable concentrated free-flowing aqueous dispersion composition according to claim 1 wherein the dyestuff precursors are furopyridinones and furopyrazinones.

37. A storage-stable concentrated free-flowing aqueous dispersion composition according to claim 36 wherein the surface active agent is a cationic surface active agent.

38. A storage-stable concentrated free-flowing aqueous dispersion composition according to claim 34 containing by weight of the entire composition: approximately 2 to approximately 7 percent of an isomeric mixture of 7-(1-ethyl-2-methyl-3-indolyl)-7-{[N-phenyl-N-(4-phenylsulfonamido)phenyl]amino}furo[3,4b]pyridine-5(7H)one and 5-(1-ethyl-2-methyl-3-indolyl)-5-{[N-phenyl-N-(4-phenylsulfonamido)phenyl]amino}-furo[3,4b]pyridine-7(5H)one; approximately 0.3 to approximately 1.5 percent of polymermic quaternary ammonium chloride; and the remainder being water.

39. A storage-stable concentrated free-flowing aqueous dispersion composition according to claim 1 wherein the dyestuff precursors are mixtures of phthalides and phenothiazines.

40. A storage-stable concentrated free-flowing aqueous dispersion composition according to claim 39 wherein the surface active agent is a cationic surface active agent.

41. A storage-stable concentrated free-flowing aqueous dispersion composition according to claim 40 containing by weight of the entire composition: approximately 2.5 to approximately 6 percent of 3,3-bis(4-dimethylaminophenyl)-6-dimethylaminophthalide; approximately 7 to approximately 12 percent of 3-(4-dimethylaminophenyl)-3-[bis(4-octylphenyl)amino]phthalide; approximately 0.5 to approximately 3 percent of benzoyl leuco methylene blue; approximately 0.3 to approximately 3 percent of polymeric quaternary ammonium chloride; and the remainder being water.

42. A storage-stable concentrated free-flowing aqueous dispersion composition according to claim 40 containing by weight of the entire composition: approximately 3 to approximately 8 percent of 3,3-bis(4-dimethylaminophenyl)-6-dimethylaminophthalide; approximately 2 to approximately 7 percent of 3-[2,4-bis(dimethylamino)phenyl]-3-(4-dimethylaminophenyl)-6-dimethylaminophthalide; approximately 0.5 to approximately 5 percent of benzoyl leuco methylene blue; approximately 0.2 to approximately 3 percent of polymeric quaternary ammonium chloride; and the remainder being water.

43. A process for the preparation of a storage-stable concentrated free-flowing aqueous dispersion composition according to claim 1 which comprises milling together approximately 2.5 to approximately 50 percent of at least one colorless carbonless duplicating dyestuff precursor; approximately 0.1 to approximately 30 percent of at least one surface active agent selected from the group consisting of anionic surface active agents, nonionic surface active agents, cationic surface active agents and amphoteric surface active agents; and water; said composition optionally having present one or more of the following by weight of the entire composition: no more than 10 percent of a glycol selected from the group consisting of ethylene glycol, propylene glycol, diethylene glycol and ethylene glycol monoethyl ether; and no more than 3 percent of alkaline substance selected from the group consisting of triethanolamine, sodium carbonate and potassium carbonate.

44. A method of incorporating one or more colorless dyestuff precursors into a coating composition for pressure sensitive carbonless duplicating manifold systems or thermal marking systems which comprises incorporating a storage-stable concentrated free-flowing aqueous dispersion composition according to claim 1 into said coating composition.

* * * * *